Figure 1:
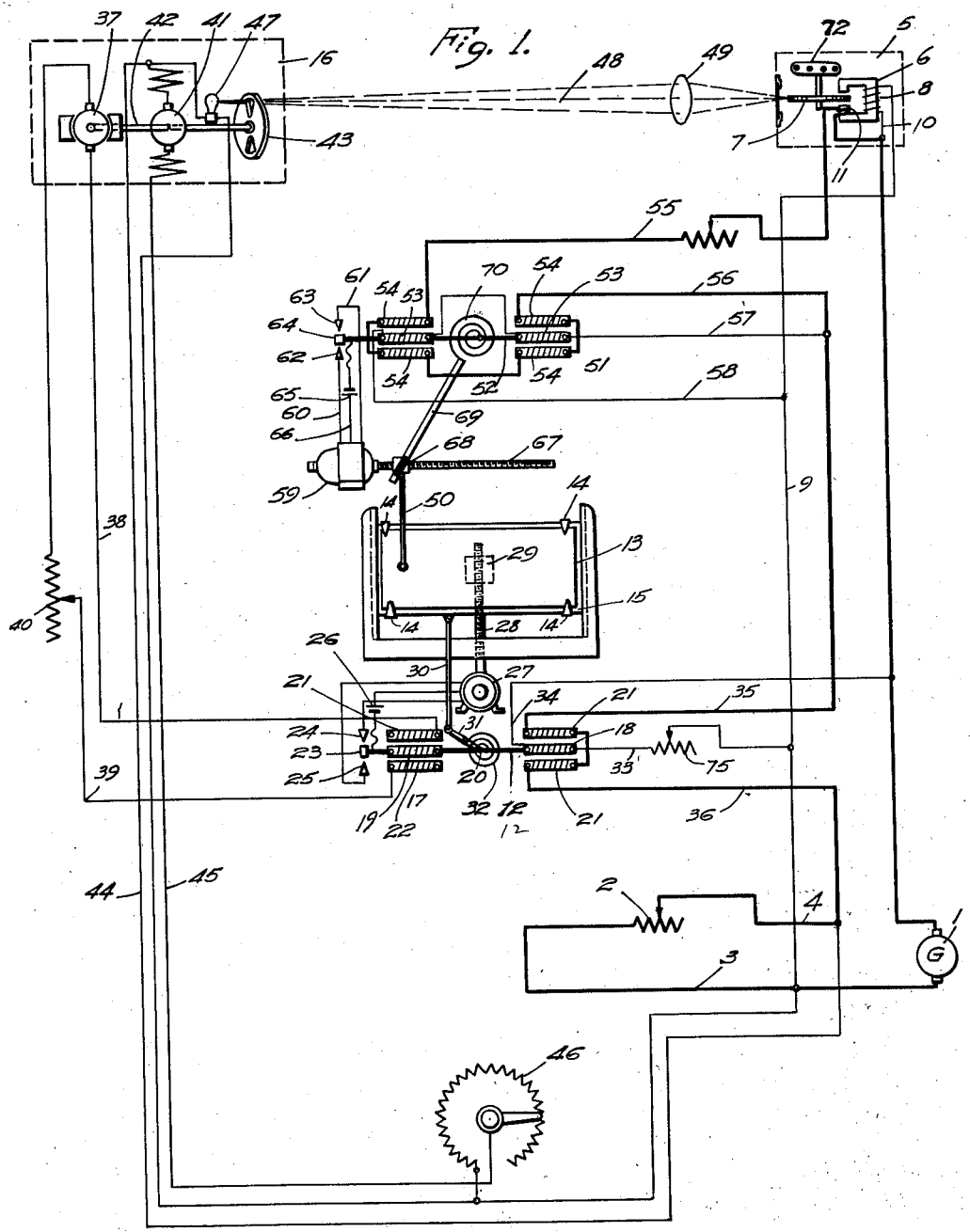

Jan. 6, 1931.  H. P. SPARKES  1,788,127

STROBOSCOPIC TESTING OF WATTHOUR METERS

Filed Oct. 30, 1928

INVENTOR
Harry P. Sparkes.
BY
Chesley G. Carr
ATTORNEY

Patented Jan. 6, 1931

1,788,127

UNITED STATES PATENT OFFICE

HARRY P. SPARKES, OF PITTSBURGH, PENNSYLVANIA, ASSIGNOR TO WESTINGHOUSE ELECTRIC & MANUFACTURING COMPANY, A CORPORATION OF PENNSYLVANIA

STROBOSCOPIC TESTING OF WATT-HOUR METERS

Application filed October 30, 1928. Serial No. 316,040.

My invention relates to stroboscopic testing of watthour meters and more particularly to a method of and means for obtaining the percent-registration-load curves of individual watthour meters.

My invention has for an object to provide means for automatically and expeditiously recording the performance of a watthour meter either by the factory immediately after manufacture or by public service company at some time during the life of the meter.

The percent-registration-load curve of a watthour meter is, as the term implies, a curve of the accuracy of the meter at various loads between zero and loads well above the full load of the meter. Such curves are usually obtained by first counting the number of revolutions made by the meter under test at various specified loads. The ratio of such number of revolutions to the number of revolutions made by a standard meter for the same load is a measure of the percent registration of the test meter. By plotting such values against the different loads used, a percent-registration-load curve is obtained. My device produces a complete "load curve" at all loads within the load range of the instrument without the necessity of an operator physically counting the number of revolutions made by the armature of the meter under test.

My invention may be readily understood if the accompanying drawings are referred to in connection with the following description.

Figure 2:
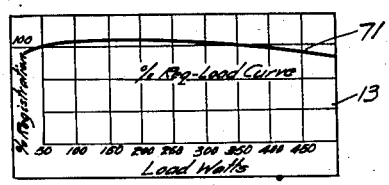

In the drawings:

Figure 1 is a schematic diagram of a stroboscopic testing device for obtaining the percent-registration-load curve of a meter constructed in accordance with my invention, and Fig. 2 is a view, in elevation, of the card having a registration-load curve marked thereon.

Referring to Fig. 1, a testing device constructed in accordance with my invention comprises a source of alternating current, as a generator 1, having a variable load 2, such as a lamp bank, connected in electric circuit relation therewith by conductors 3 and 4. A test induction watthour meter 5 is provided with an electromagnetic core 6 that is energized, in a well-known manner, to turn an armature disc 7, in accordance with the product of the voltage and the current supplied by the generator 1 to the load 2, by a voltage coil 8 connected by conductors 9 and 10 in parallel-circuit relation with the main conductors 3 and 4 and a current coil 11 connected in series-circuit relation with the main conductor 4.

The armature disc 7 is provided with a plurality of equi-spaced marks around its periphery so that its speed may be compared stroboscopically with a flickering light, which will be more fully explained hereinafter. The disc 7 is connected to the usual integrating mechanism 72 for operating the latter.

The card 13 is held in position on a flat plate holder 15 by clips 14. Novel means are provided for moving the card holder vertically in accordance with the percent registration of the meter 5 when the load 2 is varied. Such means preferably comprises a stroboscopic device 16 in combination with a differentially-actuated, relay-type meter 17. The latter consists of a plurality of coils 18 and 19 mounted on a pivoted armature 20.

The coils 18 and 19 magnetically coact with stationary coils 21 and 22 disposed, respectively, on opposite sides of said movable coils. The armature is provided with a contactor 23 mounted on one end thereof for making contact with either an upper contact 24 or a lower contact 25. When the contactor 23 touches the contact 24, a circuit, including a battery 26 and a motor 27, is completed that causes the motor 27 to rotate in a predetermined direction to lower the card holder 13 by means of the worm screw 28 and nut 29 fixed to the card holder 13 and geared to the screw 28. When the contactor touches the lower contact 25, a circuit is completed through the battery 26 and the motor 27 that rotates and raises the card holder 13.

Links 30 and 31 connect the card holder 13 to the balance arm 12 through a spiral spring 32 in such manner that a balancing action takes place between the magnetic reaction between the movable coils 18 and 19 and the between the stationary coils 21 and 22 and the bias placed on the armature 12 through the spring 32 by the position of the card holder 13.

One set of stationary and movable coils of the meter 17 is connected to measure the power in the main circuit of the load 2 by means of conductors 33 and 34 connecting the movable coil 18 in parallel-circuit relation with the load 2 and conductors 35 and 36 connecting the stationary coils 21 in series circuit with the main circuit of said load. A calibrating resistor 75 is connected in series-circuit relation with the movable coil 18 for controlling its strength. The other set of stationary and movable coils of the meter 17 is so connected to a generator 37, by means of conductors 38 and 39, through an adjustable resistor 40, as to be unbalanced by the voltage or in accordance with the speed of the generator 37. Such unbalance is differential with respect to the power unbalance of the other set of coils of meter 17. When the power in the power set of coils increases, the armature 12 moves in a direction which opposes the movement of the armature 12 when the voltage set of coils is energized, so that a torque is imparted to the armature 12 which is proportional to the percent registration of the watthour meter 5, as compared with the speed of the generator 37 as a standard.

The generator 37 is coupled to a motor 41 by a shaft 42 to which is also secured a shutter 43. The motor 41 is energized by the generator 1 through conductors 44 and 45 that are connected to the main conductors 3 and 4. A variable resistor 46 is interposed in the circuit of the conductor 45 for varying the voltage and, therefore, the speed of the motor 41. A lamp 47 is mounted near the shutter 43 to project a beam of light 48 through the same to a condensing lens 49 and thence to the periphery of the disc 7 of the watthour meter 5. The speed of the motor 41 is made to correspond to the speed of the disc 7 by adjusting the resistor 46 until the marks on the disc 7 appear stationary in the flickering light 48.

A stylus 50 is mounted to coact with the chart 13 to make a curve thereon. Means are provided for positioning the stylus 50 in accordance with the magnitude of the load 2 and such means preferably comprises a relay-type graphic wattmeter 51 that is connected to the main load circuit.

The wattmeter 51 consists of the usual balance arm 52 having coils 53 mounted on opposite sides thereof which coact with stationary coils 54 disposed at the sides of said coils 53. The stationary coils 54 are connected in series-circuit relation with the main conductor 4 by conductors 55 and 56, and the movable coils 53 are connected in parallel-circuit relation with the main conductors 3 and 4 by conductors 57 and 58.

A control motor 59 is electrically connected, by conductors 60 and 61, to contacts 62 and 63 that are mounted, respectively, below and above a contactor 64 secured to the outer end of the balance arm 52.

The contactor 64 is so connected, in electric-circuit relation, to a battery 65 by a conductor 66 that the control motor 59 turns a worm screw 67 in either direction, depending upon the position of the balance arm 52. A carriage 68 is mounted on the worm 67 to support the stylus 50 and coact with a connecting arm 69 having one end secured to a spiral spring 70 that has its other end secured to the balance arm 52. The relay-type graphic meter 51 operates in a well-known manner to keep the stylus 50 in a position corresponding to the magnitude of the load 2.

When the card 13 is placed in the holder 15, it is moved up or down by the relay-type meter 17 in accordance with the percent registration of the watthour meter 5, and the stylus 50 is moved horizontally in accordance with the load 2. A curve 71 is marked on the card 13 by such movements of the card and the stylus which is a graphic representation of the percent registration for the various loads within the range of the device.

In operating the device, the load 2 on the watthour meter 5 is gradually increased from zero load to the maximum load desired. At the same time, the resistor 46, controlling the speed of the shutter 43, is manually adjusted to keep the stroboscopic image on the disc 7 stationary at all times.

The stylus 50 moves to the right as the load 2 is increased, and the card holder 15 moves up or down, depending upon the percent registration of the watthour meter 5.

The card 13 may be conveniently marked with percent registration as abscissæ and the load in watts as ordinates. The curve 71, shown on the card 13 in Fig. 2, is a typical curve of the registration-load characteristic of a commercial-type watthour meter.

I claim as my invention:

1. In combination with a source of supply, a variable load connected to said supply, and a meter for measuring said load, of means for indicating the percent-registration-load curve of said meter comprising a plurality of relatively movable coacting members, means for changing the position of one of said members to correspond to the magnitude of said load, and means for changing the position of another of said members to correspond to the percent registration of said meter.

2. In combination with a source of supply, a variable load connected to said supply, and a meter for measuring said load, of means for indicating the percent-registration-load curve of said meter comprising a plurality of relatively movable coacting members, means for changing the horizontal position of one of said members to correspond to the magnitude of said load and means for changing the vertical position of another of said members to correspond to the percent registration of said meter.

3. In combination with a source of supply, a variable load connected to said source of supply and a meter for measuring said load, of a device for recording the percent-registration-load curve of said meter comprising a record-receiving member, a stylus coacting with said record-receiving member, means for positioning said record-receiving member in accordance with the percent registration of said meter, and means for positioning said stylus in accordance with the magnitude of said load.

4. In combination with a source of supply, a variable load connected to said source of supply and a meter for measuring said load, of a device for recording the percent-registration-load curve of said meter comprising a record-receiving member, a stylus coacting with said record-receiving member, means including a relay-type graphic meter for changing the position of said record-receiving member to correspond to the percent registration of said meter, and a relay-type graphic meter connected to said load for changing the position of said stylus to correspond to the magnitude of said load.

5. In combination with a source of supply, a variable load connected to said source of supply and a meter for measuring said load, of a device for recording the percent-registration-load curve of said meter comprising a record-receiving member, a stylus coacting with said record-receiving member, means for changing the position of said record-receiving member in accordance with the percent registration of said meter comprising a generator, means for rotating said generator in accordance with the speed of said meter, a relay-type graphic meter, and means for differentially energizing said relay-type graphic meter by said generator and by said load, and means for changing the position of said stylus to correspond to the magnitude of said load.

6. In combination with a source of supply, a variable load connected to said source of supply and a meter for measuring said load, of a device for recording the percent-registration-load curve of said meter comprising a record-receiving member, a stylus coacting with said record-receiving member, means for changing the position of said record-receiving member in accordance with the percent registration of said meter comprising a generator, stroboscopic means for governing the speed of said generator in accordance with the speed of said meter, a relay-type graphic meter, and means for differentially energizing said relay-type graphic meter by said generator and by said load, and means for changing the position of said stylus to correspond to the magnitude of said load.

7. In combination with an alternating-current source of supply, a variable load for said source of supply, a circuit for connecting said source of supply to said load, and an induction-type watt hour meter connected to said circuit for measuring the energy supplied to said load, said meter having an armature disc provided with a plurality of equispaced marks on the periphery thereof, of means for recording the percent-registration-load curve of said meter on a card comprising a card-holder and a stylus movable over the face of said card, means for moving said stylus in a line in accordance with the load on said meter, and means for moving said card holder in a line at right angles to the path of travel of said stylus comprising a relay-type graphic meter connected to said card holder, means for energizing said relay-type graphic meter in one direction in accordance with said load, and means for energizing said relay-type graphic meter in the opposite direction in accordance with the speed of said meter armature disc.

8. In combination with an alternating-current source of supply, a variable load for said source of supply, a circuit for connecting said source of supply to said load, and an induction-type watthour meter connected to said circuit for measuring the energy supplied to said load, said meter having an armature disc provided with a plurality of equi-spaced marks on the periphery thereof, of means for recording the percent-registration-load curve of said meter on a card comprising a card holder and a stylus movable over the face of said card, means for moving said stylus in a line in accordance with the load on said meter, and means for moving said card holder in a line at right angles to the path of travel of said stylus comprising a relay-type graphic meter connected to said card holder, means for energizing said relay-type graphic meter in one direction in accordance with said load, and means for energizing said relay-type graphic meter in the opposite direction in accordance with the speed of said meter armature disc, comprising a motor-generator set and stroboscopic means for comparing the speeds of said disc and said generator.

9. In combination with a source of supply, a variable load connected to said source of supply and a meter for measuring said load, of a device for recording the percent-registration-load curve of said meter comprising a record-receiving member, a stylus coacting with said member, means for changing the position of said record-receiving member in accordance with the percent registration of said meter comprising a generator, stroboscopic means for governing the speed of said generator in accordance with the speed of said meter, said stroboscopic means comprising a motor, a lamp providing a beam of light and means for periodically interrupting said beam of light, a relay-type graphic meter, and means for differentially energizing said relay-type graphic meter by said generator and by said load, and means for changing the position of said stylus to correspond to the magnitude of said load.

In testimony whereof, I have hereunto subscribed my name this 2nd day of October 1928.

HARRY P. SPARKES.